(No Model.)

D. C. SEARLES.
REVERSIBLE PRUNING TOOL.

No. 579,083. Patented Mar. 16, 1897.

WITNESSES
M. A. Pratt
E. M. Stuart

INVENTOR
David C. Searles,
by A. N. Jenner,
ATTY

THE NORRIS PETERS CO., PHOTO-LITHO., WASHINGTON, D. C.

UNITED STATES PATENT OFFICE.

DAVID C. SEARLES, OF LIVERMORE FALLS, MAINE.

REVERSIBLE PRUNING-TOOL.

SPECIFICATION forming part of Letters Patent No. 579,083, dated March 16, 1897.

Application filed February 18, 1896. Serial No. 579,708. (No model.)

*To all whom it may concern:*

Be it known that I, DAVID C. SEARLES, of Livermore Falls, in the county of Androscoggin and State of Maine, have invented certain new and useful Improvements in Reversible Pruning-Tools, of which the following, taken in connection with the accompanying drawings, is a specification.

The object of this invention is to provide for farmers' and gardeners' use in pruning trees an improved pruning implement in which are combined a hook or curved cutter and a reciprocating saw, both formed integral or firmly united and reversibly mounted in a novel manner on a single handle of any convenient length. Between the handle and the tool proper is a forked head, the tool being centrally pivoted at the extremity of the prongs of the head for reversal between them. When the hook is in use, the saw is protected between the prongs, and vice versa. A spring-pressed collar, which surrounds the stem from which these prongs rise, receives the tip of the saw or a projection on the head of the hook, so that either end of the tool is held fast while the other part is in use. A disk-like enlargement of the base of the prongs conceals the hook when reversed and forms a stop for the yielding collar to bear against. The stem or shank may be threaded to screw into the end of the handle and a ferrule or washer be interposed between the spring and handle end.

Figure 1:
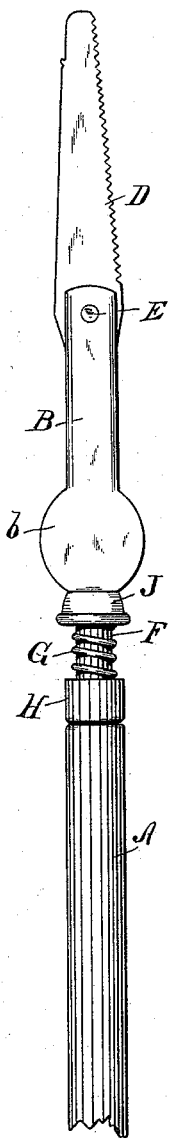
Figure 2:
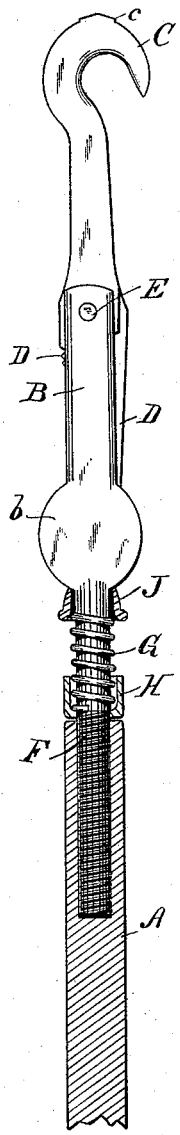
Figure 3:
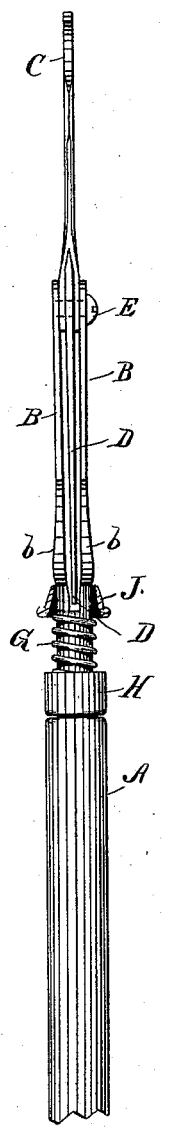

In the drawings, Figure 1 is a side view of the implement with the saw exposed. Fig. 2 shows the tool reversed to expose the hooked cutter, the handle, ferrule, and collar being in section. Fig. 3 is an edge view showing the saw between the prongs of the forked body and the collar in section.

A is the handle of the implement, B the forked head, composed of the parallel flattened prongs, and C D the tool proper, pivoted at E between said prongs at their outer end. The hooked cutter C and the short saw D shown are firmly united centrally to constitute a single tool, with the two distinct functions indicated by the construction of the parts.

The prongs of the forked head have disk-like enlargements $b$, between which the hooked cutter C rests while the saw is in use. Below these the prongs are united into a single stem or shank F, which screws into the end of the handle for convenient attachment thereto. A spring G, surrounding this stem, rests in a ferrule H and presses upwardly a ring or collar J against the lower edge of the disks or enlargements $b$. In this position the collar J incloses either the tip $d$ of the saw D or a projection $c$ on the extremity of the hooked cutter C. By thus confining one end of the tool the opposite end is held firmly for use.

When it is desired to reverse the tool, the spring-pressed collar J is pressed back slightly toward the handle until the end of the tool is released by a sidewise movement on the pivot E, after which the other end may be engaged by said collar, which is held in place by the spring G until another reversal is desired.

The curved cutter C may have a smooth keen edge or be somewhat serrated, like a sickle; and it is useful as a hook in drawing down boughs within reach of the operator in addition to its cutting action. Limbs may be severed by the saw after being thus drawn by the hook within reach of the operator.

I claim as my invention—

1. In a pruning-tool, the hook-shaped cutter C and the saw D firmly united in one and constituting the tool proper, in combination with the forked head B and the pivot E through the extremity of the prongs of said head and centrally through the interposed reversible tool, and with the spring G and the inverted ferrule H forming a socket therefor, substantially as set forth.

2. In a pruning-tool, the forked head B having two flattened parallel prongs with enlargements $b$ at their base, adapted to guard and conceal the dormant portions of the tool in both positions, and a stem or shank F inserted in the handle, in combination with the reversible tool C D pivoted between said prongs, and having projections $c$ $d$ at its respective ends, and with a spring-pressed collar surrounding said stem and adapted to hold either end of the tool fast while the other end is in use, substantially as set forth.

In testimony whereof I have signed my name to this specification, in the presence of two subscribing witnesses, on this 31st day of January, A. D. 1896.

DAVID C. SEARLES.

Witnesses:
WM. W. KEMPTON,
C. F. WHITTEMORE.